Dec. 17, 1968 M. ALIMANESTIANU 3,416,685

TRANSFER DEVICE WITH INDEPENDENTLY
MOVABLE LOAD SUPPORTING MEANS

Filed Dec. 12, 1967 2 Sheets-Sheet 1

INVENTOR.
Mihai Alimanestianu

BY Philip S. Hilbert

ATTORNEY 3,416,685
Patented Dec. 17, 1968

3,416,685

TRANSFER DEVICE WITH INDEPENDENTLY MOVABLE LOAD SUPPORTING MEANS

Mihai Alimanestianu, Nyack, N.Y., assignor to Speed-Park, Inc., New York, N.Y., a corporation of New York Filed Dec. 12, 1967, Ser. No. 690,002
6 Claims. (Cl. 214—730)

ABSTRACT OF THE DISCLOSURE

Transfer apparatus including finger means arranged for relative movement to engage and cradle objects of varying dimensions and contours, together with means for projecting and retracting the finger means relative to an object supporting surface to deposit the engaged and cradled object on such surface or to remove it therefrom.

*Background of the invention*

It has been proposed to provide transfer apparatus including comblike transfer members arranged for projected and retracted movement relative to storage stalls located on one or both sides of the transfer apparatus. Such transfer members include a plurality of parallel fingers in a common plane to provide supporting means for objects of varying length, as for example motor vehicles of different wheelbases.

As shown in applicant's Patents 2,915,204 and 3,063,-579, the use of such comblike transfer members require parallel load receiving members in the storage stalls for interdigitating relation with the fingers of the transfer members to permit transfer of the vehicle or the like, to and from the fingers of the transfer members.

An object of this invention is to provide an improved transfer apparatus for use with object supporting surfaces as they may occur in storage facilities or transport facilities including railway cars, trailers and the like; wherein the same includes transfer means comprising a comblike member having but two or three finger members, the finger members being arranged for relative movement toward and away from each other to allow the same to engage and cradle an object such as a motor vehicle or the like, for transferred movement to and from a storage stall or other object supporting surface, with disengagement from such object upon appropriate relative movement of the finger members.

Another object of this invention is to provide an improved transfer apparatus of the character described, in which the finger members are in cantilever relation to a finger supporting member, the finger members in their object engaging position being movable towards and away from an object supporting surface and being spaced therefrom, permitting such object supporting surface to take various forms including smooth, interrupted, gridlike or of irregular surface contour.

A further object of this invention is to provide transfer apparatus of the character described, particularly adapted for handling motor vehicles wherein a pair of finger members are located at one end of a finger supporting member and a single finger member is located at the other end of the finger supporting member; the pair of finger members being arranged for relative movement toward and away from each other for receiving and cradling the front wheels of a vehicle; the single finger being movable relative to the pair of finger members to locate the same in accordance with the wheel base of the vehicle and to engage the rear wheels of said vehicle.

Still another object of this invention is to provide in transfer apparatus of the character described, a base member for supporting transfer means including a pair of comblike transfer members, each transfer member having two or three finger members arranged for relative movement toward and away from each other, the pair of transfer members being arranged for selective vertical displacement to allow the uppermost transfer member to be activated for projected and retracted movement to one side of the base member, thereby allowing for selective of the transfer members to one side or the other side of the base member in accordance with the location of the object supporting surface in relation to the base member; together with object supporting means on the base member for temporarily supporting an object until one of the transfer members is activated to engage and transfer the object to the object supporting surface on the corresponding side of the base member.

Yet another object of this invention is to provide the object receiving surfaces and the object supporting means with means for immobilizing the object such as a vehicle or the like, carried thereon; the immobilizing means and the finger members of the transfer apparatus having coacting means to facilitate the movements of the finger members relative to the immobilizing means.

Other objects of this invention will in part be obvious and in part hereinafter pointed out.

*Description of a preferred embodiment*

Essentially, the transfer apparatus of the instant invention comprises a transfer member having a finger supporting means from which extend a limited number of fingers; the fingers being arranged for movement in a manner to engage and cradle an object being transferred such as a motor vehicle or the like.

Figure 1:
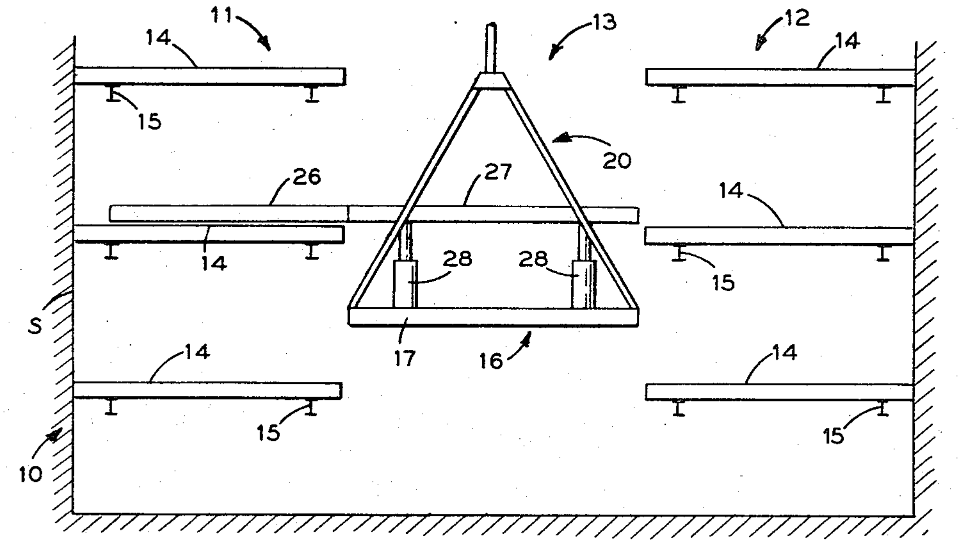
FIG. 1 is a side elevational view showing an elevator arranged for movement between tiers of stalls on opposite sides thereof; the elevator carrying transfer apparatus embodying the invention.

Thus, as shown in FIG. 1, the transfer apparatus of the instant invention is used in a storage facility 10 which comprises tiers of stalls 11, 12 located on opposite sides of an elevator shaftway 13. Each of the stalls in tiers 11, 12 comprises an object receiving surface 14 which may be continuously planar and supported on structural beams 15 in building S. The floor surfaces 14 at each level on either side of shaftway 13 are in horizontal alignment. Various objects may be stored in the individual stalls of tiers 11, 12, including motor vehicles and other objects of varying size and contour.

An elevator 16 is located in shaftway 13, the same having a platform 17 which is hoisted and lowered in a conventional manner, by suitable means, not shown. Thus, elevator 16 may be brought into operative relation to stalls on either side of shaftway 13, at a selected level to transfer an object from the elevator into a stall, or to remove an object from a stall.

The platform 17 of elevator 16 carries transfer apparatus embodying the invention and generally indicated at 20. Such apparatus comprises a pair of transfer members generally indicated at 21, 22 which are mounted on platform 17 for vertically displaced movement, and further, for movement horizontally between the elevator and a selected stall in either tier 11 or 12, to thereby effect storage or retrieval of a given object.

Figure 2:
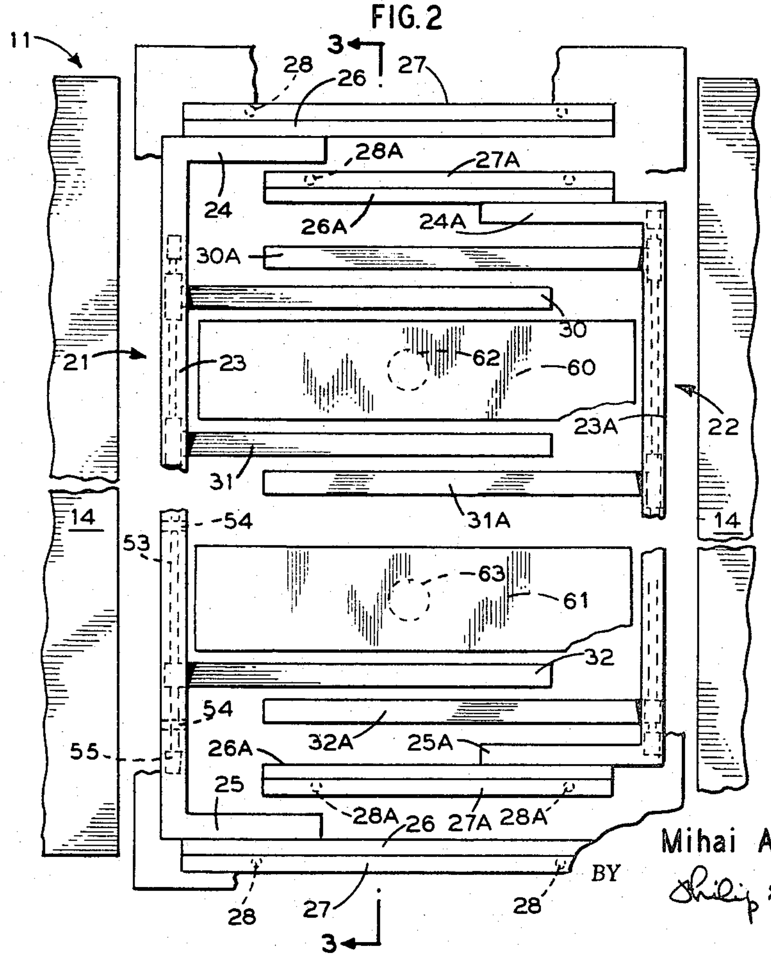
FIG. 2 is a plan view showing the transfer apparatus in relation to stalls on opposite sides thereof.

Transfer member 21 comprises an elongated finger supporting member 23 having short parallel arms 24, 25 extending transversely of one side thereof at the opposite ends thereof. Arms 24, 25 are slidably mounted in slides 26 which are in turn slidably mounted in slide supports 27 located at opposite ends of platform 17 and supported on hydraulic jacks 28 which provide for vertical displacement of transfer member 21 relative to platform 17. In the normal retracted position of transfer member 21, the supporting member 23 is located adjacent the left hand side of platform 17, looking at FIG. 2, and said transfer member is adapted to be projected to the right on slide supports 27 toward stalls in tier 12.

Transfer member 22 is similar to transfer member 21, including an elongated finger supporting member 23A, end arms 24A, 25A slidably mounted in slides 26A which slide in supports 27A mounted on hydraulic jacks 28A. Transfer member 22 has a longitudinal extent somewhat less than that of transfer member 21, to thereby allow for interfit of members 21, 22; member 22 having projected horizontal movement toward stalls in tier 11.

Transfer member 21 is provided with a pair of finger members 30, 31 which are mounted at their inner ends on finger supporting member 23, said members 30, 31 being located at one end of transfer member 21 and arranged for movement towards and away from each other, as hereinafter described. Similarly, transfer member 22 is provided with a pair of finger members 30A, 31A extending from supporting member 23A at one end thereof and also arranged for movement toward and away from each other.

Third finger members 32, 32A are respectively mounted on finger supporting members 23, 23A, at the other end thereof and arranged for movement along said members 23, 23A. Finger members 30, 31 and 32 are adapted to engage and cradle an object which is to be transferred to or retrieved from a stall in tiers 11, 12. For the purpose of illustration, the object may be a motor vehicle having front wheels X and rear wheels Y.

In such case, fingers 30, 31 and 32 may have a triangular cross section with curved inner surfaces S for contact with the tires on wheels X, Y. Thus, fingers 30, 31 are moved from widely displaced positions, toward each other, so as to engage and cradle wheels X. Similarly, the single finger 32 is moved to engage wheels Y. Thus, the vehicle is cradled as a whole on fingers 30, 31 and 32. Since fingers 30, 31 and 32 move laterally for engaging and disengaging an object, said fingers may be in raised relation to platform 17 or the load bearing surfaces 14 of the stalls in tiers 11, 12.

Figure 4:
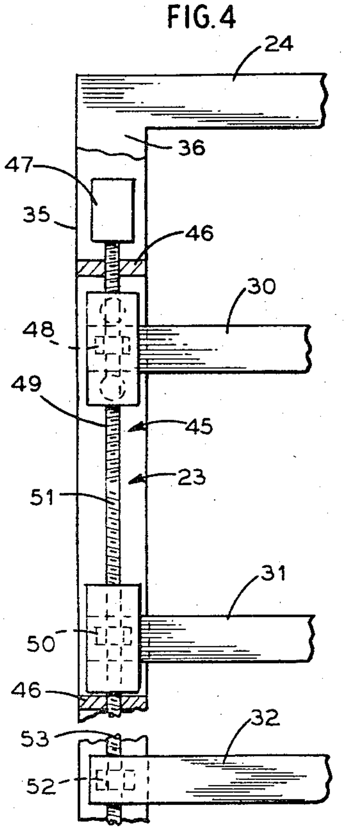
FIG. 4 is a plan view, with parts broken away, showing the finger actuating means.
Figures 5, 6:
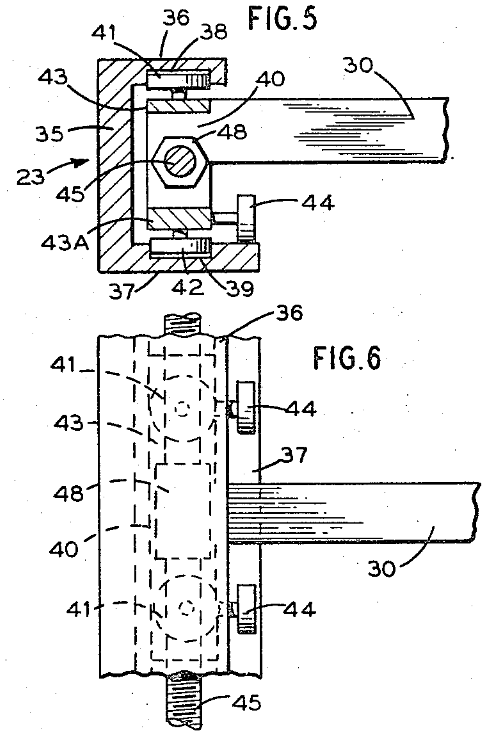
FIG. 5 is a transverse sectional view thereof.
FIG. 6 is a partial plan view thereof.

The fingers 30A, 31A and 32A may be similarly moved to engage a motor vehicle or the like, in which case the object being transferred is cradled on transfer member 22. Movement for fingers 30, 31 and 32, as well as fingers 30A, 31A and 32A, is provided, as shown in FIGS. 4–6.

The fingers 30A, 31A and 32A may be similarly moved to engage a motor vehicle or the like, in which case the object being transferred is cradled on transfer member 22. Movement for fingers 30, 31 and 32, as well as fingers 30A, 31A and 32A, is provided, as shown in FIGS. 4–6.

Thus, finger supporting member 23 is of channel cross section having a vertical web portion 35 and horizontal flange portions 36, 37. The flange portions 36, 37 are grooved to provide opposed, longitudinally extending tracks 38, 39 respectively for slidably mounting the inner ends of finger members 30, 31 and 32, via inner head portions 40 thereof, which carry a pair of displaced upper rollers 41 and a pair of displaced lower rollers 42 respectively mounted on upper and lower arms 43, 43A extending transversely of head portion 40. A pair of displaced rollers 44 extending laterally of lower arm 43A ride on the outer edge portion of lower flange 37.

It will be apparent that finger 30 is in cantilever relation to support member 23 and has stabilized movement along one end thereof. Finger 31 is similarly mounted on support member 23 and has stabilized movement along the length thereof while maintained in parallel relation to finger 30. Finger 32 is also mounted on support member 23 in a similar manner, for movement along member 23 at the other end thereof, while disposed in parallel relation to fingers 30, 31.

Means is provided for simultaneous movement of fingers 30, 31 in directions toward or away from each other. To this end, a screw member 45 is mounted within channel member 23 and supported in bearings 46 at opposite ends thereof. A reversible electric motor 47 can rotate screw member 45 in either direction. Nut means 48 is fixed to head portion 40 of finger 30 and located to pass a threaded portion 49 of screw member 45 therethrough. A second nut means 50 is fixed to the head portion of finger 31 and passes a second threaded portion 51 of screw member 45 therethrough. Threaded portions 49, 51 are of opposite turn of thread, whereby rotation of screw member 45 in one direction is effective to move fingers 30, 31 towards each other, while rotation of screw member 45 in the other direction causes fingers 30, 31 to move away from each other.

The single finger 32 is moved along support member 23 by a nut 52 in threaded engagement with a screw member 53 mounted in member 23 and rotated by a reversible electric motor 55, the member 53 being mounted in bearings 54 for rotation in either direction to thereby move finger 32 to selected positions along the member 23.

It will be apparent that upon operation of motors 47, 55; the fingers 30, 31 and 32 may be selectively moved to positions to engage and cradle the object to be transferred such as a motor vehicle or the like.

Fingers 30A, 31A and 32A, are similarly mounted on support member 23A, for movement in a manner described in connection with fingers 30, 31 and 32. However, transfer members 21, 22 may be selectively used in accordance with the particular location of the object to be transferred into a stall or to be retrieved therefrom. This involves horizontal projected and retracted movement of members 21, 22 upon siutable operation of jacks 28 or 28A to bring the selected member 21, 22 to an appropriate level in respect to platform 17.

The horizontal projected and retracted movement of members 21, 22 may be accomplished by means known in the art, and typically shown in Patent 2,915,204. By having transfer members 21, 22 in vertically displaced relation, through suitable operation of jacks 28, 28A; the uppermost transfer member may execute horizontal movements in its transfer operations without interference from the lowermost transfer member.

Figure 7:
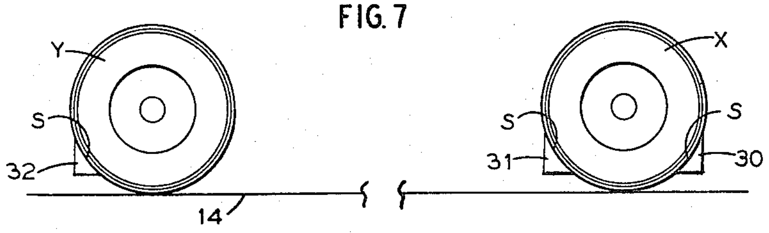
FIG. 7 is a side elevational view showing the cradling action of the fingers of the transfer means in respect to the wheels of a vehicle.

Thus, it will be apparent, that with an object such as a motor vehicle at ground level and located beneath tier 12 would be handled by transfer member 21 with elevator 16 at ground level, thereby permitting transfer member 21 to be projected to the right, looking at FIG. 1. The fingers 30, 31 and 32 would then be moved to positions engaging wheels X, Y, FIG. 7 and thus engage and cradle the vehicle. Retraction of transfer member 21 into elevator 16, followed by raised movement of the elevator to a selected level, where the transfer member could then be projected into a stall in tier 12 to locate the vehicle on surface 14 thereof; the fingers 30, 31 and 32 being then moved in directions to disengage wheels X, Y; followed by retraction of transfer member 21.

However, if the motor vehicle or other object to be stored, is located on the right hand side of shaftway 13 at ground level, and is to be transferred to a stall in tier 11, on the left hand side of shaftway 13; then the object which is originally received on transfer member 21 at ground level, must be transferred to transfer member 22 in order to pass the same to a stall in tier 11.

Figure 3:
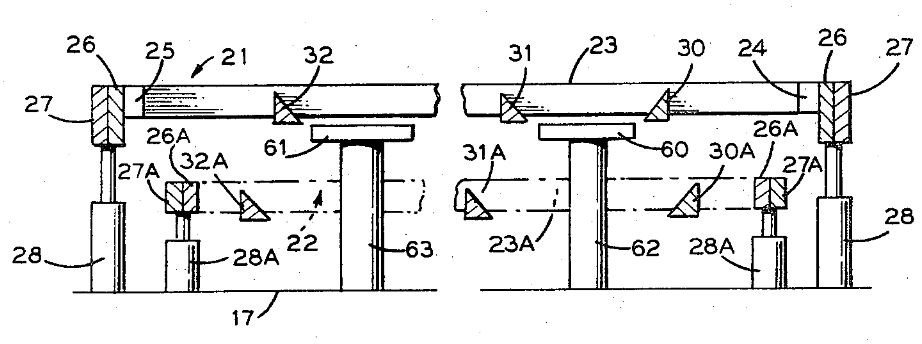
FIG. 3 is a longitudinal sectional view taken on the line 3—3 of FIG. 2.

Accordingly elevator 16 is provided with object supporting floor portions 60, 61 in raised relation to platform 17, by pedestals 62 63 respectively. Floor portions 60, 61 are of such dimensions and spacing as to accommodate motor vehicles of varying wheel base. As incidated in FIG. 3 the finger members 30, 31, 32; and 30A, 31A and 32A can be moved to positions along supporting members 23, 23A to clear the forward and rear edges of floor portions 60, 61.

Thus, transfer member 21 may be operated to transfer a motor vehicle from ground level and at the right side of shaftway 13 to floor portions 60, 61; at which time transfer member 22 is in its inactive, depressed position. The transfer member 21 is then operated to disengage fingers 30, 31 and 32 thereof from the wheels of the vehicle to positions clearing the floor portions 60, 61 and depressing said member 21 to an inactive position.

The transfer member 22 is then operated to allow its fingers 30A, 31A and 32A to engage the wheels of the vehicle and when elevator 16 has reached the proper level, the transfer member 22 and its load is projected into the stall in tier 11 for deposit on surface 14 thereof, in the manner previously described.

Obviously, the foregong procedure may be reversed, when the vehicle or other object is located at ground level on the left side of shaftway 13 and is to be stored in a stall in tier 12 on the right side of said shaftway. In this case, transfer member 22 will be initially used to pass the vehicle to floor portions 60, 61 and thereafter transfer member 21 will be used to pass the vehicle from said floor portions 60, 61 to the selected stall in tier 12.

It will be apparent that fingers 30, 31, 32 or 32A, 31A, 32A are adapted to engage the vehicle wheels at points raised above the supporting surface thereof, whether at a transfer station at ground level, adjacent either side of shaftway 13; or the supporting surfaces in the stalls of tiers 11, 12. Thus, the nature of such supporting surfaces is not material and in fact may be smooth, irregular, gridlike or of other configuration. Also, the fingers 30, 31, 32; 30A, 31A, 32A may have any desired configuration in respect to those surface portions thereof which are to engage a particular object and thus may be complementary to the surface contours thereof at the point of engagement.

The fingers 30, 31, 32; 30A, 31A, 32A are so located on supporting members 23, 23A and have relative movements such as to be able to engage and cradle vehicles or other objects of varying dimensions. In some instances fingers 31, 31A may be omitted, in which case, an object may be engaged and cradled by fingers 30, 32; 30A, 32A.

As various changes might be made in the herein disclosed embodiment of the invention without departing from the spirit thereof, it is understood that all matter herein shown or described shall be deemed illustrative and not by way of limitation except as set forth in the appended claims.

I claim:

1. A transfer apparatus for transferring an object to and from an object supporting surface, said apparatus comprising a base portion, transfer means movably mounted on said base portion, for projection and retracted movement toward and away from said object supporting surface, said transfer means comprising a finger supporting member extending susbtantially transverse of the path of movement of said transfer means, a pair of laterally spaced finger means projecting from one side of said finger supporting member, means for movably mounting at least one of said finger means on said supporting member for movement relative to the other finger means, said finger means including portions for engaging and cradling an object therebetween, and means for effecting relative movement between said finger means in directions for engaging or disengaging said object, said apparatus including a second transfer means movably mounted on said base portion for projected and retracted movement toward and away from a second object supporting surface oppositely located relative to said first object supporting surface, said second transfer means comprising a finger supporting member extending parallel to said first finger supporting member and laterally spaced therefrom, a pair of spaced finger means projecting from one side of said second finger supporting member towards said second mentioned object supporting surface, means for movably mounting at least one of said second mentioned pair of finger means, means for effecting relative movement betwen said second pair of finger means, and means for vertically displacing said first and second transfer means to place the uppermost of said transfer means in a position for horizontal projection or retraction towards and away from the associated object supporting surface, each of said first and second transfer means comprises third finger means movably mounted on the respective finger supporting members thereof and means for moving said third finger means towards and away from one of said pair of finger means associated therewith, object support means on said base portion for receiving an object transferred thereto by one of said first and second transfer means, said object supporting surface means comprising a pair of longitudinally spaced supporting surface portions, the third finger means and the one finger means of each of said transfer means being normally located on opposite sides of one of the supporting surface portions of said object supporting surface means.

2. Apparatus as in claim 1 and further including third finger means projecting from said one side of said finger supporting member and located between said pair of finger means, and means for moving said third finger means toward and away from one of said pair of finger means for engaging and disengaging a portion of said object.

3. Apparatus as in claim 2 and further including means for simultaneously moving said third finger means and said one finger means toward and away from each other to vary the spacing therebetween.

4. Apparatus as in claim 1, wherein said finger moving means comprising rotatable means and movable means coacting with said rotatable means for interconnecting said finger supporting member and said movable finger means, and means for rotating said rotatable means.

5. Apparatus as in claim 3 wherein said last mentioned finger moving means comprises a screw member having successive thread portions of opposite thread direction, means for rotatably mounting said screw member on said finger supporting member, nut means on each of said third finger means and said one finger means, said nut means being in threaded engagement with the respective threaded portions of said screw member, and reversible means for rotating said screw member in either direction.

6. Transfer apparatus as in claim 1 and further including means for mounting the inner end portions of said finger supporting member in cantilever relation thereto.

References Cited

UNITED STATES PATENTS

| | | | |
|---|---|---|---|
| 2,770,381 | 11/1956 | Hegarty | 214—731 |
| 2,773,612 | 12/1956 | West et al. | 214—16.1 X |
| 2,773,614 | 12/1956 | Edwards et al. | 214—16.1 X |
| 2,847,131 | 8/1958 | Miller | 214—16.1 |
| 2,958,436 | 11/1960 | Skutle et al. | 214—731 |
| 2,985,328 | 5/1961 | Fitch | 214—731 |
| 2,995,263 | 8/1961 | Fitch | 214—731 |
| 3,063,579 | 11/1962 | Alimanestiano | 214—16.1 |
| 3,212,654 | 10/1965 | Dolphin | 214—730 |

FOREIGN PATENTS

| | | |
|---|---|---|
| 154,013 | 9/1951 | Australia. |

GERALD M. FORLENZA, *Primary Examiner.*
R. B. JOHNSON, *Assistant Examiner.*

U.S. Cl. X.R.

214—16.1, 731